(12) United States Patent
Haelvoet

(10) Patent No.: US 12,508,967 B2
(45) Date of Patent: Dec. 30, 2025

(54) METHOD FOR POSITIONING A SHAKER AND USE OF THE SHAKER FOR VIBRATION CONTROL

(71) Applicant: PSS BELGIUM NV, Dendermonde (BE)

(72) Inventor: Tom Haelvoet, Ghent (BE)

(73) Assignee: PSS BELGIUM NV, Dendermonde (BE)

(\*) Notice: Subject to any disclaimer, the term of this patent is extended or adjusted under 35 U.S.C. 154(b) by 271 days.

(21) Appl. No.: 18/033,702

(22) PCT Filed: Oct. 22, 2021

(86) PCT No.: PCT/EP2021/079309
§ 371 (c)(1),
(2) Date: Apr. 25, 2023

(87) PCT Pub. No.: WO2022/090070
PCT Pub. Date: May 5, 2022

(65) Prior Publication Data
US 2023/0391240 A1    Dec. 7, 2023

(30) Foreign Application Priority Data
Oct. 26, 2020  (GB) .................................. 2016939

(51) Int. Cl.
*B60N 2/879* (2018.01)
*B60N 2/90* (2018.01)
*H04R 9/06* (2006.01)

(52) U.S. Cl.
CPC ............... *B60N 2/879* (2018.02); *B60N 2/90* (2018.02); *H04R 9/06* (2013.01)

(58) Field of Classification Search
CPC ............. B60N 2/879; B60N 2/90; H04R 9/06
See application file for complete search history.

(56) References Cited

U.S. PATENT DOCUMENTS

| | | |
|---|---|---|
| 6,198,828 B1 | 3/2001 | Kuo |
| 10,457,179 B1 | 10/2019 | Kentley-Klay |
| 2008/0111408 A1 | 5/2008 | Duran et al. |
| 2009/0152917 A1 | 6/2009 | Ostler et al. |
| 2012/0189132 A1 | 7/2012 | Sakamoto et al. |
| 2019/0193615 A1 | 6/2019 | Mankame et al. |

(Continued)

FOREIGN PATENT DOCUMENTS

| | | |
|---|---|---|
| CN | 110949219 A | 4/2020 |
| CN | 211252320 U | 8/2020 |
| DE | 3235373 A1 | 3/1984 |

(Continued)

OTHER PUBLICATIONS

Great Britain Search Report from corresponding GB Application No. 2016939.7, Mar. 1, 2021.

(Continued)

*Primary Examiner* — Milton Nelson, Jr.
(74) *Attorney, Agent, or Firm* — Workman Nydegger

(57) ABSTRACT

A method for positioning a shaker in a seat includes a headrest and a backrest. The headrest has a bass loudspeaker. The shaker is positioned in the headrest. The seat is typically a seat in a motor vehicle or a seat in a theatre or a massage chair or an entertainment chair.

15 Claims, 3 Drawing Sheets

(56) References Cited

U.S. PATENT DOCUMENTS

2019/0202331 A1* 7/2019 Cimatti ................ B60N 2/90
2022/0353614 A1* 11/2022 Cai ....................... H04R 5/02

FOREIGN PATENT DOCUMENTS

| EP | 2657086 A1 | 10/2013 |
| FR | 3021003 A1 | 11/2015 |
| KR | 200420245 Y1 | 7/2006 |
| WO | 2019024985 A1 | 2/2019 |
| WO | 2019121266 A1 | 6/2019 |
| WO | 2019192808 A1 | 10/2019 |
| WO | 2020009112 A1 | 1/2020 |

OTHER PUBLICATIONS

International Search Report from corresponding PCT Application No. PCT/EP2021/079309, Feb. 21, 2022.
Extended European Search Report from Corresponding European Patent Application No. EP25187779.1, Oct. 21, 2025.

* cited by examiner

METHOD FOR POSITIONING A SHAKER AND USE OF THE SHAKER FOR VIBRATION CONTROL

FIELD OF THE INVENTION

The present invention is generally related to the field of sound systems for integration into a seat of a motor vehicle or an entertainment chair or the like. The invention also relates to techniques for performing vibration control in such a seat or chair. The invention further relates to the characterisation of the sound system via vibrations it produces.

BACKGROUND OF THE INVENTION

It is commonly known that sound systems can be provided in seats to enhance the user experience of the person occupying the seat. Speakers of such a system are for example placed in the backrest of the seat. The sound system may further comprise one or more shakers, e.g. in the seat bottom as disclosed in US2009/152917 A1. Such solutions can be applied in a wide variety of seats, like e.g. massage chairs, gaming chairs, motor vehicle seats, entertainment chairs and so on.

Vibrations caused by the low frequencies in the sound signal may be acceptable to people as a natural enhancement while listening to music or, in other cases, may get annoying over time, depending on the magnitude of the vibrations and the preference of the listener. Shakers are used to make the person in the chair experience the vibrations from the low frequencies in the sound signal. The sound is so made tactile. Shakers look very much like a common loudspeaker, except for the fact that the membrane (diaphragm) is missing. Hence, the shaker has no cone. A typical scheme of a shaker (1) is illustrated in FIG. 1. Within a housing (30), usually provided with mounting ears (40), is placed a magnetic circuit (50) wherein a magnet is positioned in a U-yoke. The magnet is covered by a top plate. On a voice coil former (37) is provided a voice coil (38) which is driven by a low-frequency audio signal. The current passing through the voice coil produces a magnetic field which interacts with the magnetic field of the magnet. The voice coil former is connected to the housing, for example by means of glue (39). Dampers (51), also called spiders, are provided between the housing and the magnetic circuit to give stiffness.

In the automotive industry shakers can be applied for example in car seats. Shakers are typically integrated either directly in the foam of a seat or somewhere connected to the lower parts of the seat frame. This results in either a very local sensation or in the need for a very performant shaker to move the whole seat assembly.

The technical field of active vibration noise control is quite vast. In most applications vibration noise is considered as a problem that corrupts desired signals. Consequently, most techniques for active noise control aim at reducing or even completely eliminating this type of noise.

In WO2019/024985 A1 an active road noise control system and method for a vehicle is disclosed. A microphone sense signal is generated representative of road noise occurring in or at a wheel well of the vehicle. The microphone sense signal is iteratively and adaptively processed to provide a noise reducing signal. The system and method further include generating from the noise reducing signal with a headrest loudspeaker arrangement disposed in a headrest in an interior of the vehicle, noise reducing sound at a listening position in the interior of the vehicle.

EP2657086 is concerned with an active vibration noise control apparatus. The apparatus comprises a cancellation sound output that outputs a sound that cancels front wheel vibration noise due to vibration at a position to be silenced on the basis of a front wheel reference signal, and a sound that cancels rear wheel vibration noise due to predicted vibration at the position to be silenced on the basis of a rear wheel reference signal. When a difference in travel trajectory between a front wheel and a rear wheel is detected based on a turning state, the output of the rear wheel cancellation sound is suppressed.

US2012/189132 presents an active vibration noise control apparatus that uses an adaptive control process, which predicts rear road wheel noise cancelling sounds by correcting a front road wheel reference signal or a rear road wheel reference signal with a corrective filter, based on different characteristics of front road wheel suspensions and rear road wheel suspensions.

Hence, there is a need for improved application of shakers in particular, but not exclusively, in the automotive industry. There is further a need for techniques for vibration control based on the availability of a shaker.

SUMMARY OF THE INVENTION

It is an object of embodiments of the present invention to provide for a method for positioning a shaker in a seat, for example a motor vehicle seat. It is a further object of the invention to provide a method for active vibration control of a seat comprising a shaker so positioned and a characterization method that can be applied when performing active vibration control.

The above objective is accomplished by the solution according to the present invention.

In a first aspect the invention relates to a method for positioning a shaker in a seat comprising a headrest and a backrest, said headrest comprising a bass loudspeaker. The method is characterised in that the shaker is positioned in the headrest.

The proposed solution indeed allows for sensing more natural vibration through the whole of the seat. This is achieved thanks to the shaker being positioned in the neighbourhood of the source of the vibrations, i.e. the loudspeaker. In this way a good mechanical coupling is obtained between the shaker and the bass loudspeaker in the frequency range of interest, e.g. the frequencies from 30 Hz to 100 Hz. The inventors have found that by applying a loudspeaker mounted in the headrest and capable of reproducing low frequency content, the vibrations generated by this loudspeaker during operation are perceived as very pleasant and well synchronized with the audio. Thanks to the shaker being provided near to the loudspeaker this observation can further be exploited.

In preferred embodiments the shaker is placed at most 40 cm from the top edge of the seat, when the headrest is placed in its highest position. It was found that in this condition there is still enough coupling between the vibrations from the loudspeaker and from the shaker. The headrest may in some cases be mounted on one or more extendable pins. The distance from the top edge is then to be measured with the headrest in its highest position, so that also in that case it is ensured the vibrations are sufficiently coupled.

In some embodiments the headrest and the backrest are integrated. One example of this may be a seat in a sports car.

In advantageous embodiments the shaker has an axis of movement substantially aligned with a movement axis of the loudspeaker comprised in the headrest. This is beneficial for the coupling between the vibrations.

In one embodiment the shaker can be directly mounted on the loudspeaker or being integral with the loudspeaker assembly. Alternatively the loudspeaker assembly may comprise a loudspeaker and loudspeaker suspension element, so that the loudspeaker can be flexibly suspended from the headrest by means of said suspension element.

In one embodiment the bass loudspeaker is arranged to also deal with frequencies in the midrange and high frequency range. In other words, the bass loudspeaker is then designed to have a frequency response also in a range comprising frequencies higher than 200 Hz. In other embodiments separate mid frequency and high frequency loudspeakers may be provided.

In some embodiments the shaker is comprised in a bass unit containing said bass loudspeaker.

In another embodiment the shaker is arranged to generate a haptic message which is not correlated with an audio stream applied to the loudspeaker.

In another aspect the invention relates to a method for characterizing a loudspeaker in a seat comprising a headrest and a backrest by means of a shaker. The method comprises:
  positioning a shaker in said seat as previously described,
  characterising said loudspeaker being positioned in said headrest, by transmitting a first given signal over a first audio path comprising said loudspeaker, and determining, from said first signal and an output signal of said loudspeaker and taking into account a second audio path comprising said shaker, a set of coefficients representative of said loudspeaker.

Having the loudspeaker so characterised allows for various techniques to process and exploit the vibrations. Often comments are made on these vibrations that they are too pronounced or too weak dependent on the implementation of the loudspeaker and the situation, content and/or taste from the occupant/listener. With the loudspeaker characterization as described these issues can be dealt with.

In a preferred embodiment the method for characterizing the loudspeaker comprises characterising said shaker by transmitting a second given signal to the shaker over that second audio path comprising the shaker, and determining, from the second signal and an output signal of the shaker, a set of coefficients representative of the shaker. The set of coefficients representative of the shaker is then used when determining the set of coefficients representative of the loudspeaker.

In a preferred embodiment the output signal of the loudspeaker and, optionally, the output signal of the shaker are measured by an accelerometer having a measurement axis parallel to an axis of movement of the loudspeaker and, optionally, of the shaker.

Advantageously, the first signal and/or second signal is a digital noise signal.

In one embodiment the set of coefficients representative of the loudspeaker and, optionally, the set of coefficients representative of the shaker are stored in a memory.

In certain embodiments the method comprises a step of correlating the output signal of the shaker with the output signal of the loudspeaker.

In a further aspect the invention also relates to the use of the method for characterizing as previously described for performing active control of vibrations output by the loudspeaker, wherein an audio source is applied to a first audio path comprising the loudspeaker and to a second audio path comprising the shaker and a filter derived from the set of coefficients representative of the shaker and the set of coefficients representative of the loudspeaker, whereby the second audio path has an adjustable gain.

The adjustable gain is preferably variable in a range between −1 and +1, boundaries included. In a particularly useful embodiment the gain is set fixed. For example, the gain value can be fixed to −1, so that the vibrations of the loudspeaker are substantially cancelled.

The invention also relates to the use of the method for characterizing as described above in a motor vehicle, wherein drive train vibrations of the motor vehicle are correlated with the output signal of the shaker.

The invention also relates to a method for characterizing an audio device by means of a shaker, the method comprising:
  characterizing said shaker by transmitting a first given signal to said shaker over an audio path comprising said shaker, and determining, from said first given signal and an output signal of said shaker, a set of coefficients representative of said shaker,
  characterizing said audio device by transmitting a second given signal over another audio path comprising said audio device, and determining, from said second given signal and an output signal of said audio device and exploiting said set of coefficients representative of said shaker, a set of coefficients representative of said audio device.

The output signal of the audio device and, optionally the output signal of the shaker, may be measured by an accelerometer having a measurement axis parallel to an axis of movement of the loudspeaker and, optionally, of the shaker.

Advantageously, the first signal and/or second signal is a digital noise signal.

The set of coefficients representative of the audio device and, optionally, the set of coefficients representative of the shaker are preferably stored in a memory.

The method may comprise a step of correlating the output signal of the shaker with the output signal of the audio device.

The audio device to be characterized may be another shaker.

The invention then also relates to the use of the method for characterizing as set out above for performing active control of vibrations output by the audio device, wherein an audio source (possibly part of the audio device) is applied to a first audio path comprising said audio device and to a second audio path comprising the shaker and a filter derived from the set of coefficients representative of said shaker and said set of coefficients representative of said audio device, said second audio path optionally having an adjustable gain. In this approach the audio device can then be eliminated and the vibrations it produces are emulated by the shaker.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

FIG. 2a gives a side view and FIG. 2b a back view.

DETAILED DESCRIPTION OF ILLUSTRATIVE EMBODIMENTS

Figure 1:
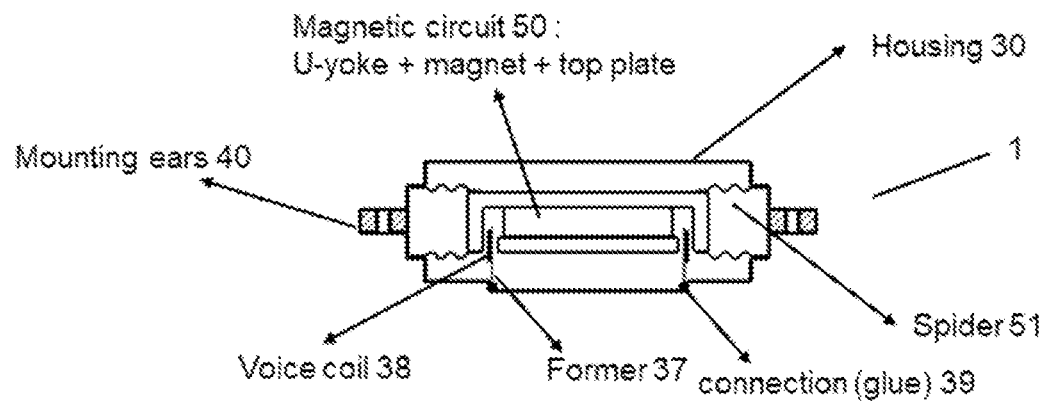
FIG. 1 illustrates a typical scheme of a shaker as known in the art.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention discloses in a first aspect a method for positioning a shaker in a seat. The seat may in some preferred embodiments be a seat in a motor vehicle, e.g. a car. In other embodiments it may be a seat in a movie theatre, a massage chair, a gaming chair or an entertainment chair in general.

The seat comprises a headrest and a backrest. The seat may in some embodiments be a sport seat with integrated headrest. In that case with headrest is meant the upper part of the seat, while the backrest corresponds to the part against which the back rests, i.e. the part of the seat below the headrest. The seat may then comprise a single chassis, e.g. a metal frame, for both the backrest part and the headrest part. In other embodiments the headrest and the backrest part are connected with each other via one or more mounting pins which often are movable to a certain extent in order to adjust the height of the headrest. The headrest and the backrest may each be mounted on a chassis, e.g. a metal frame.

The headrest further comprises a loudspeaker. In preferred embodiments the loudspeaker is a bass loudspeaker designed to reproduce low frequencies, e.g. frequencies in the range between 30 Hz and 100 Hz. These frequencies are in this description also referred to as bass frequencies. In some embodiments this functionality may be implemented by means of more than one bass loudspeaker, for example one on the left hand side of the headrest and one on the right hand side. The loudspeaker(s) can be mounted directly on the headrest chassis in some embodiments. In other embodiments the loudspeaker(s) can be mounted on the headrest chassis via a flexible suspension element. Suspension elements for loudspeakers are well known and exist in a wide variety. For example, a suspension element may be a roll suspension, a metal spring, a rubber band and so on. The presence and tuning, e.g. filtering, of such a flexible suspension element may influence, for example reduce, the initial amount of vibrations passed onto the seat (see WO2019/121266A1). Apart from the bass loudspeakers also one or more mid frequency or high frequency loudspeakers (e.g. of the cardioid type) may be provided, e.g. in the headrest. Alternatively, the bass loudspeaker can be designed to extend its frequency response in the upper frequency range, i.e. the range above 200 Hz, to act as a so called full-range loudspeaker.

In the positioning method of the invention a shaker is placed in the headrest. It was found that positioning the shaker in the neighbourhood of the loudspeaker leads to a good mechanical coupling between the shaker and the loudspeaker frame, in particular in the bass frequency range, e.g. in the range from 30 Hz to 100 Hz. In this way a natural vibration perception is created when the shaker is fed with a music signal or audio fragment for haptic feedback (see later).

Figure 2A:
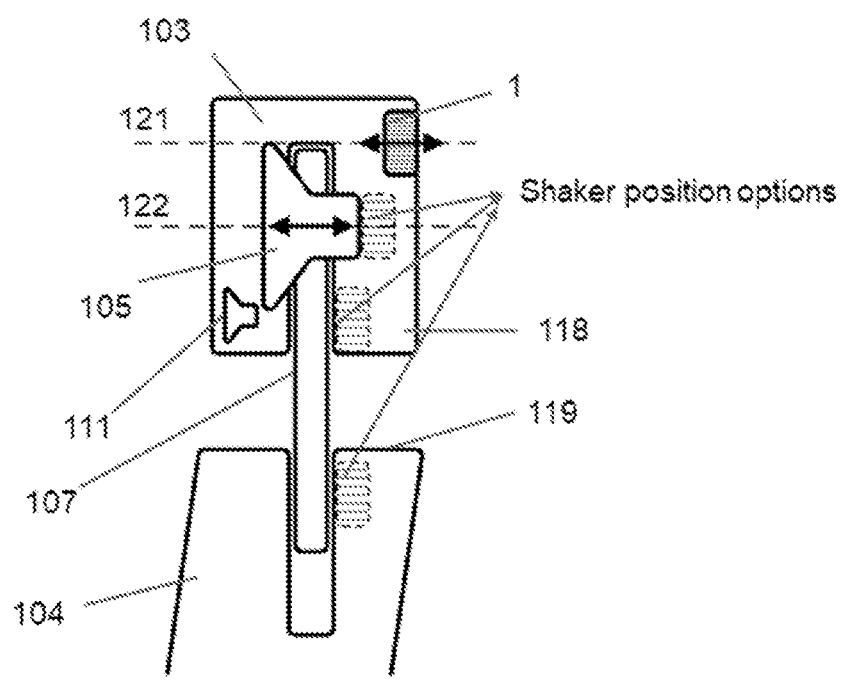
FIG. 2a and FIG. 2b illustrate some possible positions of the shaker in the headrest.

FIG. 2a illustrates in a side view some possible positions where the shaker (1) can be placed. FIG. 2a shows an embodiment wherein a backrest (104) is separated from the headrest (103). The backrest and headrest are connected via mounting pins (107). A bass loudspeaker (105) is either directly fixed on the headrest chassis (118) or suspended from the chassis by means of a suspension element. The backrest is mounted on a chassis (119). The figure illustrates four possible positions for the shaker. The position of the shaker is however not limited to the examples shown in the figure. Three positions are in the headrest itself. The fourth position is in the backrest close to the top edge of the latter. Indeed, in some embodiments the shaker may be positioned in the upper part of the backrest, e.g. in a zone at most 40 cm, preferably at most 30 cm, more preferably at most 20 cm away from the top edge of the headrest, when the headrest is placed in its highest possible position. In that case it is found there is still a strong enough mechanical coupling to have correlated vibrations of the shaker and the loudspeaker. Also the mid-high loudspeakers (111) provided in the headrest are visible in FIG. 2a.

In advantageous embodiments the shaker is so positioned that it has an axis (121) of movement which is substantially aligned, e.g. parallel, with the dynamic movement axis (122) of the loudspeaker in the headrest along which the voice coil can travel. This is the case for all four shaker positions illustrated in FIG. 2a and 2b. This is beneficial for maintaining a good coupling between vibrations from the loudspeaker and the shaker.

Figure 2B:
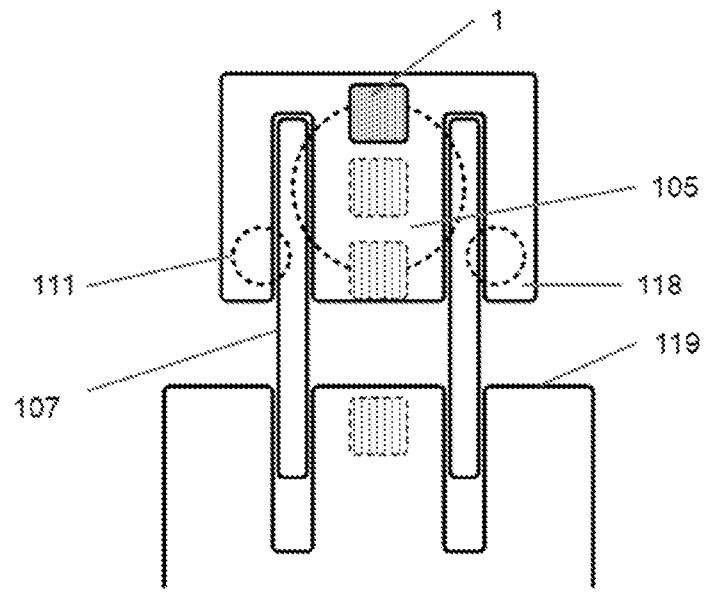

In FIG. 2b a back view is provided of the positioning of FIG. 2a. It can be seen that in this example there are two mounting pins in parallel. The bass loudspeaker is positioned centrally in the headrest in this embodiment. Also the position of the separate mid-high loudspeakers is indicated.

Figure 3:
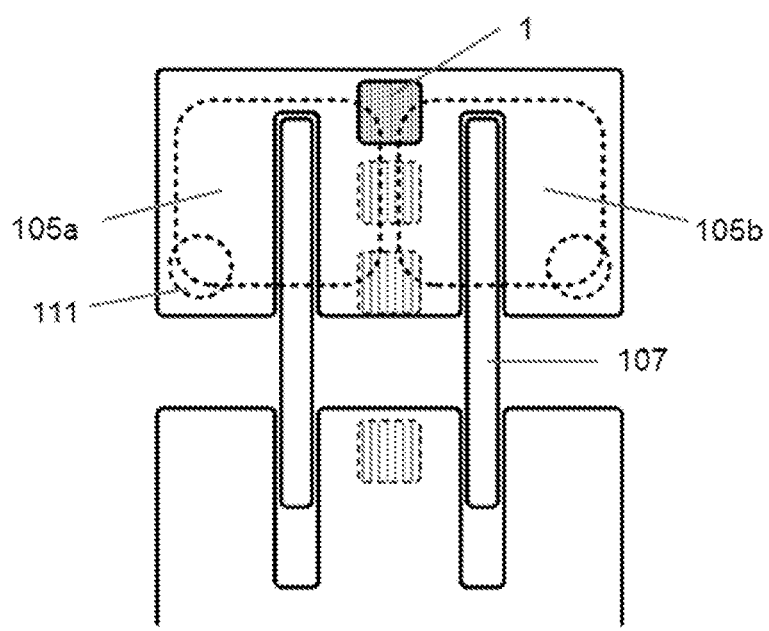
FIG. 3 illustrates a back view of another way of arranging the shaker.

An alternative implementation of the headrest is illustrated in FIG. 3. The central bass loudspeaker of FIG. 2a and 2b is replaced by two bass loudspeakers at the left and right side of the headrest. The possible positions of the shaker are similar to those in FIG. 2a and 2b: either in the headrest itself close to the bass loudspeaker or in the top part of the backrest.

In some embodiments the shaker may be a part of the bass unit comprising the loudspeaker. The shaker may be mounted on the loudspeaker. Alternatively, the shaker may be mounted on the frame of the headrest. As already mentioned the loudspeaker may be flexibly suspended.

Positioning of the shaker in the neighbourhood of the loudspeaker in the headrest is advantageous in that the vibrations of the shaker and the loudspeaker then share a more or less common transfer path (depending on how close to each other the loudspeaker and shaker are placed) to the seat occupant, who experiences the sum of the vibrations of the loudspeaker and of the shaker. A positive correlation then exists between the vibrations in the frequency range of interest (i.e. the bass frequencies, e.g. between 30 and 80 Hz).

The correlation between vibrations from the loudspeaker and vibrations from the shaker can be exploited to characterize the vibration profile of the bass loudspeaker at or near the location of the shaker.

One way to achieve this is now described. In the context of active noise control the term 'primary path' is commonly used to indicate the propagation path from the source where the stimulus signals are produced through the loudspeaker. The so called secondary path is the path where the vibrations produced in the primary path are compensated for. In other words, the secondary path comprises the functional blocks required to construct a signal to compensate the loudspeaker vibrations. Typically the secondary path has a sufficient mechanical coupling with the primary path.

Figure 4:
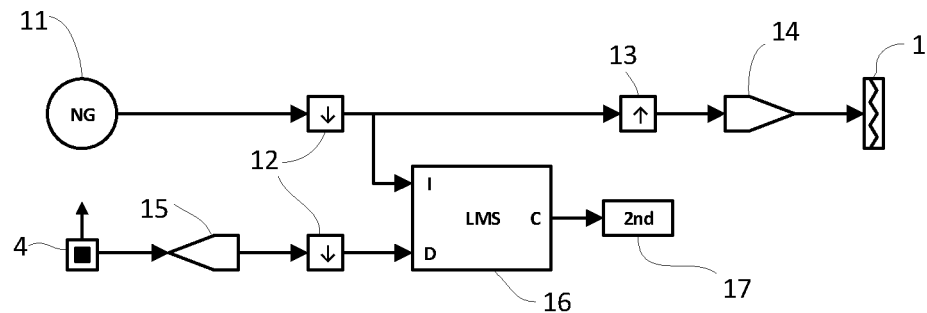
FIG. 4 illustrates a DSP scheme for characterizing the secondary path.

FIG. 4 depicts a scheme of a digital signal processor (DSP) that can be used to characterize the secondary path, i.e. the path from the source through the shaker. An accelerometer (4) is employed to calibrate this audio path. Preferably, the measurement axis of the accelerometer is parallel to the axis of movement of the shaker. A stimulus signal is generated, for example with a noise generator (11) as shown in FIG. 4. The noise generator may for example be a digital noise generator producing a wideband noise signal at a given sample rate, e.g. 44.1 kSamples/s. In the embodiment shown in FIG. 4 a digital sample rate converter (12) reduces this sample rate (e.g. with a factor 16) in function of the bandwidth of the vibrations to be cancelled. A further digital sample rate converter (13) increases the sample rate again (e.g. to the original sample rate or to another sample rate) for playback of the noise via the output block (14) comprising in this example a digital-to-analog converter and an amplifier to the shaker (1) in the headrest.

In certain implementations of the method on e.g. a DSP there may be no sample rate conversion needed depending on the characteristics of the vibrations, in particular the bandwidth.

The output signal of the shaker is picked up by the accelerometer, which is connected to a DSP input. In the DSP the received signal may be applied to a preamplifier and is analog-to-digital converted (in block (15)) before undergoing a same sample rate downconversion as the generated stimulus signal. In the implementation shown in FIG. 4 both the downsampled signal from the accelerometer and the downsampled stimulus signal are applied to an adaptive filter (16). This adaptive filter is in advantageous embodiments arranged for performing a Least Mean Squares (LMS) algorithm or a normalized LMS algorithm or a Recursive Least Squares (RLS) algorithm or another flavour of the LMS algorithm. All these algorithms are as such very well known in the art, as the skilled person will readily recognize.

The resulting set of coefficients from the adaptive digital filter can be seen as an impulse response $\hat{S}(z)$ of a finite impulse response (FIR) filter that approximates the vibration transfer function $S(z)$ of the shaker.

$$\hat{S}(z) \approx S(z) \qquad (1)$$

The secondary transfer path can thus be emulated by means of the FIR filter with the calculated set of coefficients. The set of coefficients representing the secondary path are stored in a memory (17).

Various alternative ways to characterize the secondary path can be envisaged. As an example, one can build a virtual model with gains, delays and infinite impulse response (IIR) filters, all tweaked to closely match the behaviour of the shaker or other elements in this transfer path. Another approach could be to build a duplicate set in hardware and use a real-world shaker in parallel to emulate the behaviour of the original shaker. In one embodiment one can immediately proceed to a step wherein the primary path is characterized (as described below) and the correlation between vibrations originating from the loudspeaker and vibrations produced by the shaker is evaluated without any dedicated modelling of the secondary transfer path.

Figure 5:
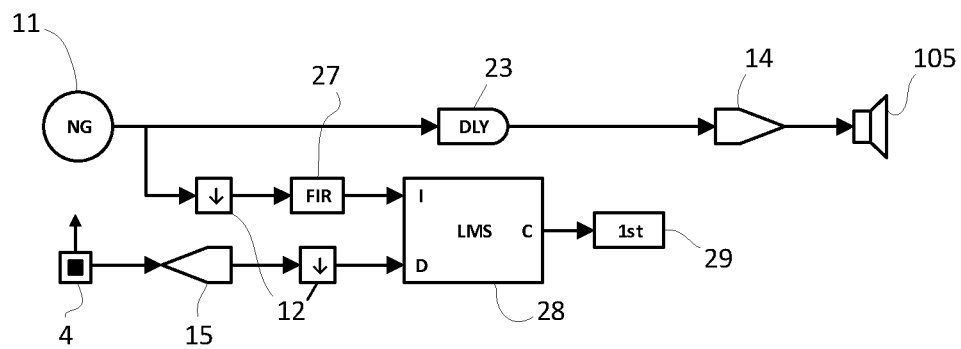
FIG. 5 illustrates a DSP scheme for characterizing the primary path.

Next the transfer path of the loudspeaker (i.e. the one or more bass loudspeakers) is identified. In case there is more than one bass loudspeaker (as e.g. in the embodiment of FIG. 3) the voice coils of the loudspeakers are placed in parallel so that they can receive a same voltage signal. FIG. 5 provides a scheme of a DSP model to measure the primary transfer path. Again an accelerometer is used in the set-up. As in FIG. 4, the measurement axis of the accelerometer is preferably parallel to the axis of movement of the shaker.

In order to obtain a good correlation between loudspeaker vibrations and shaker vibrations a scheme (see FIG. 5) similar to that of FIG. 4 is used, with some substantial changes, however. Again a source (11) produces a stimulus signal. In preferred embodiments the source is a digital noise generator that generates a wideband noise signal. In the primary path a delay line D(z) (23) is provided to delay the stimulus signal so that alignment with the processing in the rest of the scheme can be achieved. It is not strictly needed to perform the downsampling and upsampling as in FIG. 4 to obtain good correlation. The loudspeaker is driven by the same output block (14) as in FIG. 4, comprising in this example a digital-to-analog converter and an amplifier.

The input to the adaptive filter coming from the downsampled noise generator is now prefiltered with a FIR filter (27) wherein the set of coefficients is loaded as obtained from the secondary transfer path calculations. The other input to the adaptive filter is the loudspeaker signal picked up by the accelerometer and preamplified and digitized just as in the scheme of FIG. 4. In an advantageous embodiment a filtered-x LMS algorithm can then be run. As a result a FIR filter $\hat{P}(z)$ is obtained that approximates the vibration transfer function L(z) of the loudspeaker over the shaker:

$$\hat{P}(z) \approx \frac{1}{\hat{S}(z)} \cdot D(z) \cdot L(z) \quad (2)$$

In this way both the shaker and the loudspeaker can be modeled.

Filtered-x LMS algorithms are well known in the art. Use of this algorithm is very popular in active noise control applications where low frequency noise is to be attenuated by means of an anti-noise signal that is added to the noisy input signal. To generate the anti-noise signal a secondary path is required. The algorithm is in fact a modified version of the original LMS algorithm.

Apart from applying a filtered-x LMS algorithm there are various other algorithms that can be employed to characterize the vibration transfer function of the loudspeaker over the shaker. For example another flavour of an LMS can be used, like normalized LMS or RLS. These alternatives are well known and extensively described in the literature.

The sets of coefficients representing the secondary path and the primary path, respectively, can be exploited in various applications.

Figure 6:
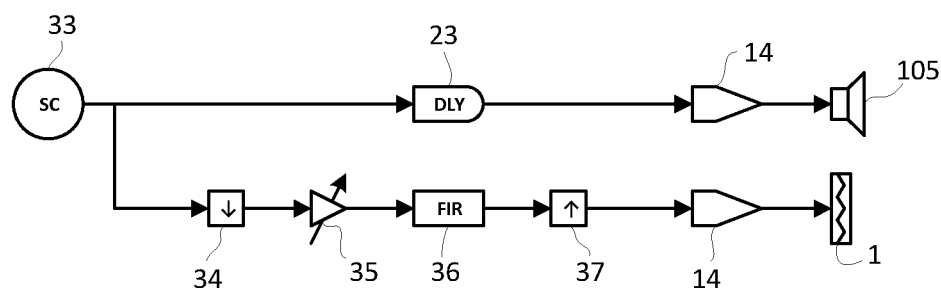
FIG. 6 illustrates a scheme for controlling vibrations of the loudspeaker by means of a secondary path comprising a shaker.

A first application relates to active vibration control. The scheme of FIG. 6 is considered. The upper branch is basically similar to that in FIG. 5. A source (33) intended for media playback (e.g. music) produces a signal which is sent to the delay line (23) and the DAC and amplifier at the output of the DSP. The output signal then goes to the loudspeaker (3). The upper branch transfer path can be written as:

$$D(z) \cdot L(z) \quad (3)$$

The lower branch receives the same signal from source (33) and comprises a downsampler (34), a variable gain (35), a FIR filter with the set of coefficients of the primary path, an upsampler (37) to restore the original sample rate, a DAC and amplifier (14) and the shaker (1). The transfer function of this lower branch can be written as $$\hat{P}(z) \cdot S(z) \quad (4)$$

which is approximately equal to $$\frac{1}{\hat{S}(z)} \cdot D(z) \cdot L(z) \cdot S(z) \quad (5)$$

Exploiting the expression (1) one can see both branches have approximately the same transfer path function:

$$\hat{P}(z) \cdot S(z) \approx D(z) \cdot L(z) \quad (6)$$

The audio source shown in FIG. 6 can be for example be part of a home cinema installation or be a conventional car speaker system. The vibrations produced by the shaker are complementary to the music playback.

The variable gain can be given a value depending on the application at hand. For example, with a gain value equal to 1, the vibrations produced by the shaker are substantially equal to those coming out of the loudspeaker. In other words, the vibrations experienced by the listener are enhanced. By increasing the variable gain factor to a value above 1, the shaker becomes the dominant source of vibrations. By setting the gain value to −1 the vibrations coming from the lower branch are in counterphase, so that the vibrations from the loudspeaker are substantially cancelled. Obviously, when setting the variable gain value to 0, the lower branch is eliminated from the scheme. In some embodiments the variable gain can be adjusted by the seat occupant. In the applied approach the loudspeaker as such can be eliminated and the vibrations it produces are emulated by the shaker.

In another application the shaker can be used to generate vibrations to be added to powertrain vibrations for example in an electric vehicle or a hybrid electric vehicle or a plug-in hybrid electric vehicle. With powertrain is meant the group of components that deliver power to the vehicle, including the engine. It is a known problem that the powertrain of such vehicles produces little sound (few vibrations) so that, for example, an acceleration from 70 km/h to 120 km/h becomes an experience that is hardly noticeable compared to when one is driving in a sports car. A scheme as illustrated in FIG. 6 can then be applied to artificially generate vibrations and enhance the user experience of the driver in a personalised way.

In a further application the shaker can be used to provide haptic messages to warn an occupant for example of an incoming call or incoming message or to provide lane assistance. Also for providing feedback with respect to certain actions taken in the car, e.g. car lock or unlock, engine start or stop, shift of gear, the shaker may be arranged to produce an adequate sound (vibrational signal).

It is to be noted that in the characterization of the primary path, i.e. the transfer path of the loudspeaker, as e.g. in FIG.

5 only the vibrations produced by the loudspeaker are exploited in the path identification process.

Therefore the proposed technique can readily be adapted to perform a characterization of another device capable of producing vibrations. In a further aspect the present invention also relates to such a general process to characterize an audio device. The audio device may for example be another shaker. Below this other shaker or audio device in general is also referred to as the device under test. The device under test may thus also be an audio device different from a shaker. In a further application field the audio device can be replaced by any device arranged for producing vibrations as device under test. Examples may include, but are not limited to, wellness devices and vehicle powertrains.

In a first step of the proposed method the secondary path comprising the shaker is characterized in the same way as explained with reference to FIG. 4. An accelerometer (4) is employed to calibrate this audio path. The measurement axis of the accelerometer is preferably parallel to the axis of movement of the shaker. A stimulus signal is generated, for example with a noise generator (11) as in FIG. 4. The noise generator may for example be a digital noise generator producing a wideband noise signal at a given sample rate, e.g. 44.1 kSamples/s. In the implementation shown in FIG. 4 a digital sample rate converter (12) reduces this sample rate (e.g. with a factor 8 or 16) in function of the bandwidth of the vibrations to be cancelled. A further digital sample rate converter (13) increases the sample rate again (e.g. to the original sample rate or to another sample rate) for playback of the noise via the output block (14) comprising in this example a digital-to-analog converter and an amplifier to the shaker (1).

In certain implementations of the method on e.g. a DSP there may be no sample rate conversion needed depending on the characteristics of the vibrations, in particular the bandwidth.

The output signal of the shaker is picked up by the accelerometer, which is connected to a DSP input. In the DSP the received signal may be applied to a preamplifier and is analog-to-digital converted before undergoing a same sample rate downconversion as the generated stimulus signal. In the implementation shown in FIG. 4 both the downsampled signal from the accelerometer and the downsampled stimulus signal are applied to an adaptive filter (16). This adaptive filter is in advantageous embodiments arranged for performing a Least Mean Squares (LMS) algorithm or a normalized LMS algorithm or a Recursive Least Squares (RLS) algorithm or another flavour of the LMS algorithm. All these algorithms are as such very well known in the art, as the skilled person will readily recognize.

As a result a set of coefficients is obtained (see expression (1)) which approximates the vibration transfer function of the shaker. The secondary transfer path can thus be emulated by means of the FIR filter with the calculated set of coefficients. The set of coefficients representing the secondary path are stored in a memory (17). As already mentioned previously, alternative ways to identify the secondary path can be applied as well.

Next the transfer path containing the device under test is identified (i.e. the primary path), e.g. another shaker. To obtain good correlation between vibrations from the device under test and those from the shaker a scheme can be used as in FIG. 5, whereby the loudspeaker (105) is now replaced by the device under test. A source (11) produces a stimulus signal. The source may be a digital noise generator that generates a wideband noise signal. In the primary path a delay line D(z) (23) is provided to delay the stimulus signal so that alignment with the processing in the rest of the scheme can be achieved. It is not strictly needed to perform the downsampling and upsampling as in FIG. 4 to obtain good correlation. The audio device is driven by the same output block (14) as in FIG. 4, comprising in this example a digital-to-analog converter and an amplifier.

The input to the adaptive filter coming from the downsampled noise generator is now prefiltered with a FIR filter (27) wherein the set of coefficients is loaded as obtained from the secondary transfer path calculations. The other input to the adaptive filter is the signal from the device under test picked up by the accelerometer and preamplified and digitized just as in the scheme of FIG. 4. Advantageously a filtered-x LMS algorithm can then be run. As a result a FIR filter $\hat{P}(z)$ is obtained that approximates the vibration transfer function L(z) of the device under test over the shaker:

$$\hat{P}(z) \simeq \frac{1}{\hat{S}(z)} \cdot D(z) \cdot L(z) \quad (2)$$

In this way both the shaker and the device under test (e.g. another shaker) can be modeled.

The variable gain can be given a value depending on the application at hand. For example, with a gain value equal to 1, the vibrations produced by the shaker are substantially equal to those coming out of the audio device. In other words, the vibrations experienced by the listener are enhanced. By increasing the variable gain factor to a value above 1, the shaker becomes the dominant source of vibrations. By setting the gain value to −1 the vibrations coming from the lower branch are in counterphase, so that the vibrations from the audio device are substantially cancelled. Obviously, when setting the variable gain value to 0, the lower branch is eliminated from the scheme. In some embodiments the variable gain can be adjusted by the user. In the applied approach the audio device as such can be eliminated and the vibrations it produces are emulated by the shaker.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for characterizing a loudspeaker in a seat comprising a headrest and a backrest by means of a shaker positioned in the headrest, the headrest further comprising said loudspeaker, the method comprising:
   characterizing the shaker by transmitting a second given signal to the shaker over a secondary audio path comprising the shaker, and determining, from the second signal and an output signal of the shaker, a set of coefficients representative of the shaker,
   characterizing said loudspeaker in said headrest, by transmitting a first given signal over a primary audio path comprising said loudspeaker, and
   determining, from said first signal, an output signal of said loudspeaker and the set of coefficients representative of the shaker, a set of coefficients representative of said loudspeaker.

2. The method for characterizing a loudspeaker as in claim 1, wherein said output signal of said loudspeaker and, optionally said output signal of said shaker, are measured by an accelerometer having a measurement axis parallel to an axis of movement of said loudspeaker and, optionally, of said shaker.

3. The method for characterizing a loudspeaker as in claim 1, wherein said first signal and/or said second signal is a digital noise signal.

4. The method for characterizing a loudspeaker as in claim 1, wherein said set of coefficients representative of said loudspeaker and, optionally, said set of coefficients representative of said shaker are stored in a memory.

5. The method for characterizing a loudspeaker as in claim 1, comprising a step of correlating said output signal of said shaker with said output signal of said loudspeaker.

6. The method according to claim 1, wherein power train vibrations of a motor vehicle are correlated with said output signal of said shaker.

7. The method for characterizing a loudspeaker as in claim 1, wherein the shaker is placed at most 40 cm from a top edge of the seat, when the headrest is placed in its highest position.

8. The method for characterizing a loudspeaker as in claim 1, wherein the headrest and the backrest are integrated.

9. The method for characterizing a loudspeaker as in claim 1, wherein the shaker has an axis of movement substantially aligned with a movement axis of the loudspeaker.

10. The method for characterizing a loudspeaker as in claim 1, wherein the loudspeaker is designed to have a frequency response in a frequency range higher than 200 Hz.

11. The method for characterizing a loudspeaker as in claim 1, wherein the shaker is comprised in a bass unit containing the loudspeaker.

12. The method for characterizing a loudspeaker as in claim 1, wherein the shaker is configured to generate a haptic message which is not correlated with an audio stream applied to the loudspeaker.

13. A method for performing active control of vibrations output by a loudspeaker in a seat comprising a headrest and a backrest, the headrest further comprising said loudspeaker and a shaker, the method comprising:
    characterizing the shaker by transmitting a second given signal to the shaker over a secondary audio path comprising the shaker, and determining, from the second signal and an output signal of the shaker, a set of coefficients representative of the shaker,
    characterizing said loudspeaker in said headrest, by transmitting a first given signal over a primary audio path comprising said loudspeaker, and determining, from said first signal, an output signal of said loudspeaker and the set of coefficients representative of the shaker, a set of coefficients representative of said loudspeaker, and
    applying an audio source to a first audio path comprising said loudspeaker and to a second audio path comprising said shaker and a filter derived from said set of coefficients representative of said shaker and said set of coefficients representative of said loudspeaker, said second audio path having an adjustable gain.

14. The method according to claim 13, wherein said adjustable gain is variable in a range between −1 and +1.

15. The method according to claim 13, wherein said adjustable gain is set fixed.

* * * * *